United States Patent [19]
Jones, Jr.

[11] Patent Number: 5,345,568
[45] Date of Patent: Sep. 6, 1994

[54] INSTRUCTION FETCH CIRCUIT WHICH ALLOWS FOR INDEPENDENT DECODING AND EXECUTION OF INSTRUCTIONS

[75] Inventor: Morris E. Jones, Jr., Saratoga, Calif.

[73] Assignee: Chips and Technologies, Inc.

[21] Appl. No.: 762,629

[22] Filed: Sep. 19, 1991

[51] Int. Cl.$^5$ ............................ G06F 9/06; G06F 9/28
[52] U.S. Cl. .................................... 395/375; 395/800; 364/DIG. 1
[58] Field of Search ................................. 395/375, 800

[56] References Cited
U.S. PATENT DOCUMENTS

| | | | |
|---|---|---|---|
| 3,825,902 | 7/1974 | Brown | 395/725 |
| 5,125,092 | 6/1992 | Prener | 395/725 |
| 5,179,691 | 1/1993 | O'Brien | 395/500 |

*Primary Examiner*—Alyssa H. Bowler
*Attorney, Agent, or Firm*—Benman Collins & Sawyer

[57] ABSTRACT

A instruction fetch circuit which allows portions of the instruction to be decoded and executed independently. The invention includes a first register for storing a digital data word having first and second bytes. The first register provides first and second outputs of the first and second digital bytes respectively. A first multiplexer circuit is included for selecting and storing either of the first or second outputs of the first register and providing a first intermediate output corresponding thereto. A second multiplexer circuit is included for selecting and storing either of the first or second outputs of the first register or the first intermediate output of the first multiplexer circuit and providing a second intermediate output corresponding thereto. Control circuitry is included for selectively activating the first register and the first and second multiplexer circuits to present portions of the instruction for decoding. Additional multiplexer circuits are included to handle larger instructions.

1 Claim, 1 Drawing Sheet

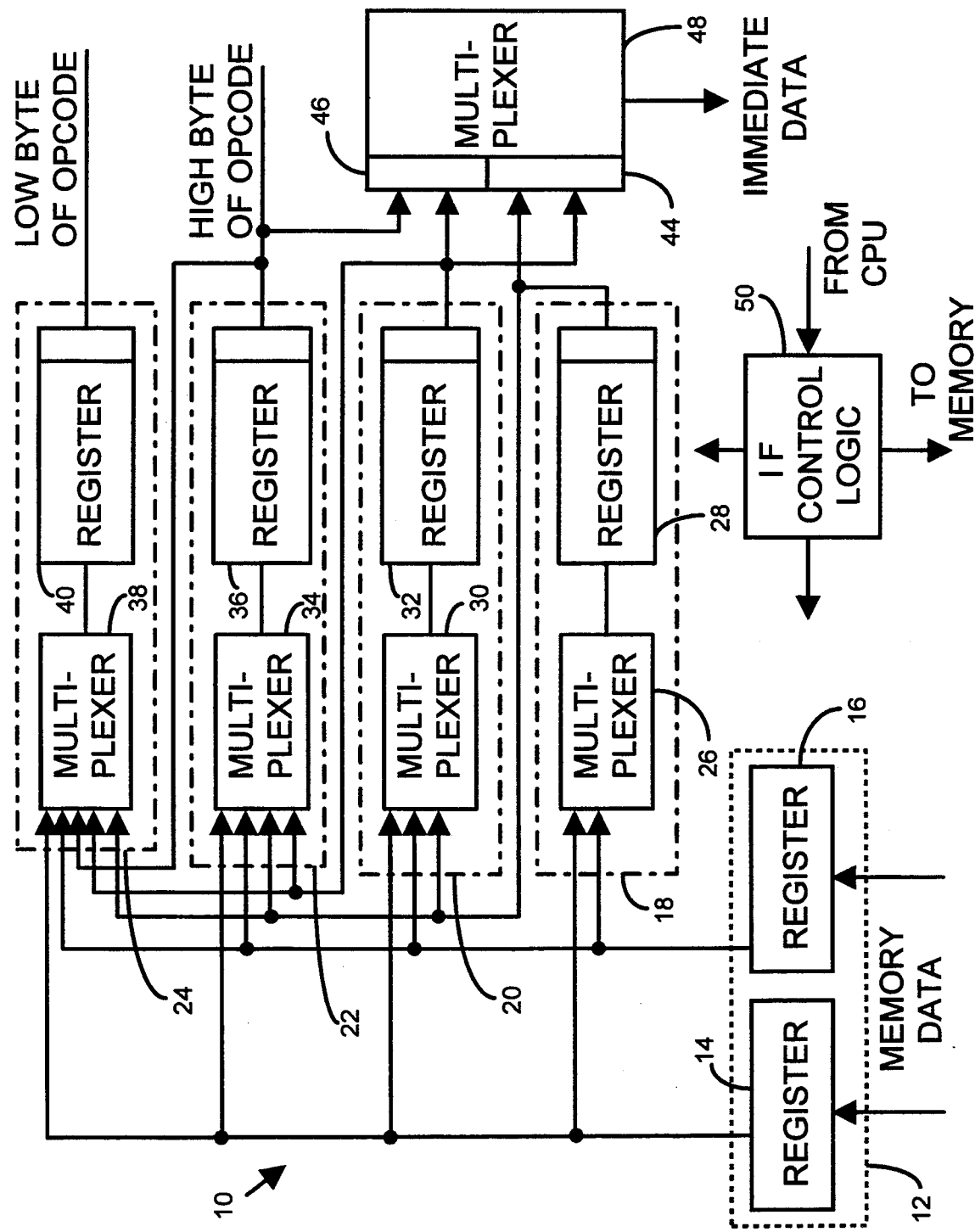

INSTRUCTION FETCH CIRCUIT WHICH ALLOWS FOR INDEPENDENT DECODING AND EXECUTION OF INSTRUCTIONS

BACKGROUND OF THE INVENTION

1. Field of the Invention

The present invention relates to computer systems. More specifically, the present invention relates to techniques for decoding instructions in a central processing unit of a computer.

While the present invention is described herein with reference to illustrative embodiments for particular applications, it should be understood that the invention is not limited thereto. Those having ordinary skill in the art and access to the teachings provided herein will recognize additional modifications, applications, and embodiments within the scope thereof and additional fields in which the present invention would be of significant utility.

2. Description of the Related Art

As is well known, computers execute a sequence of instructions which are provided to the central processing unit (CPU) thereof. The instructions are typically stored while being decoded and executed by the CPU. As the format of the instructions varies from one system to another, compatibility between systems presumes a capability on the part of the emulating system to decode instructions written for the emulated system. System compatibility is easily achieved by simply designing the emulating system in accordance with the design of the emulated system. However, this option may not be viable when the design of the emulated system is proprietary.

Thus, there is a need in the art for a system for decoding instructions on an emulating system to provide compatibility with an emulated system. In particular, there is a need for a novel system for decoding 808X instructions which does not encroach on the proprietary rights of others. One essential component of such a system would be a novel system for fetching instructions to be decoded. In addition, there is an ongoing need in the art for improvements in the speed of the decoding operation.

SUMMARY OF THE INVENTION

The need in the art is addressed by the novel instruction fetch circuit of the present invention. In general, the invention includes a first register for storing a digital data word having first and second bytes. The first register provides first and second outputs of the first and second digital bytes respectively. A first multiplexer circuit is included for selecting and storing either of the first or second outputs of the first register and providing a first intermediate output corresponding thereto. A second multiplexer circuit is included for selecting and storing either of the first or second outputs of the first register or the first intermediate output of the first multiplexer circuit and providing a second intermediate output corresponding thereto. Control circuitry is included for selectively activating the first register and the first and second multiplexer circuits to present portions of the instruction for decoding.

In a specific implementation, additional multiplexer circuits are included to handle larger instructions. In any event, the present invention provides a novel instruction fetch arrangement which allows portions of the instruction to be decoded and executed independently.

BRIEF DESCRIPTION OF THE DRAWING

The FIGURE is a block diagram of an illustrative embodiment of the instruction fetch circuit of the present invention.

DESCRIPTION OF THE INVENTION

Illustrative embodiments and exemplary applications will now be described with reference to the accompanying drawings to disclose the advantageous teachings of the present invention.

In order to decode the 808X instruction set, for example, at high speed, up to four bytes of data need to be examined at the same time. These are:

OPL (low byte of opcode)
OPH (high byte of opcode, contains the R/M addressing information)
IMML (low byte of immediate data, or displacement)
IMMH (high byte of immediate data or displacement)

During the normal execution of an instruction, data may be removed from these locations, and subsequent data examined. Typically, OPL stays on the instruction platform during the entire instruction execution time. OPH contains addressing data for some opcodes and immediate data for others. It tends to stay on the platform during the entire instruction execution. IMML and IMMH contain immediate data. These bytes of the instruction contain data that will be used for calculating an effective address in memory, or for use as immediate data. Quite often, this data is used and then discarded during the normal instruction decode and execution. New data is placed in these bytes that allows the subsequent bytes of the instruction to be treated as either immediate data or not used.

At the end of each instruction, all data used is discarded, and the bytes OPL - IMMH need to be reloaded with new bytes of data for the next instruction. Instruction lengths vary from one to six bytes in length. In order to determine the length of the instruction, it is necessary to examine both the first and second bytes of the opcode. In the case of a "one" byte opcode, the second byte is not needed.

As explained more fully below, the present invention provides a novel instruction fetch arrangement which allows two portions of the instruction platform to be shifted separately and an overlapped decode of one instruction with the fetch of the next.

The Figure is a block diagram of an illustrative embodiment of the instruction fetch circuit 10 of the present invention. The circuit 10 includes a first shift register circuit 12 which, in the illustrative embodiment, is implemented with two shift registers 14 and 16. The shift registers 14 and 16 are connected to a source of instruction data, typically memory, which provides the constituents components (bytes) of a digital instruction word, intermediate data low (IDL) and intermediate data high (IDH) respectively. The outputs of the first and second registers 14 and 16 are first and second outputs of the first shift register circuit 12 and are input to first, second, third and fourth multiplexer circuits 18, 20, 22, and 24 respectively. Each multiplexer circuit includes a multiplexer and a shift register.

The first multiplexer circuit includes a 2 to 1 multiplexer 26 connected to an IMH (immediate high) shift register 28. The multiplexer 26 selects between the first and second outputs of the first shift register circuit 12, that is, the outputs of the first and second shift registers 14 and 16. The selected byte is stored in the IMH shift register 28 and output as a first intermediate output.

The second multiplexer circuit includes a 3 to 1 multiplexer 30 connected to an IML (immediate low) shift register 32. The multiplexer 30 selects between the first and second outputs of the first shift register circuit 12, that is, the outputs of the first and second shift registers 14 and 16, or the output of the IMH shift register 28. The selected byte is stored in the IML shift register 32 and output as a second intermediate output.

The third multiplexer circuit includes a 4 to 1 multiplexer 34 connected to an OPH (opcode high) shift register 36. The multiplexer 34 selects between the first and second outputs of the first shift register circuit 12, that is, the outputs of the first and second shift registers 14 and 16, or the output of the IMH shift register 28 or the output of the IML shift register 32. The selected byte is stored in the OPH shift register 36 and output as a third intermediate output.

The fourth multiplexer circuit includes a 5 to 1 multiplexer 38 connected to an OPL (opcode low) shift register 40. The multiplexer 38 selects between the first and second outputs of the first shift register circuit 12, that is, the outputs of the first and second shift registers 14 and 16, or the output of the IMH shift register 28 or the output of the IML shift register 32 or the output of the OPH shift register 36. The selected byte is stored in the OPL shift register 40 and output as a fourth intermediate output.

The fourth intermediate output provides a low byte of opcode for decoding, the third intermediate output provides a high byte of opcode for decoding. Immediate data is provided by an output multiplexer circuit 42 including first and second shift registers 44 and 46 adapted to store the first and second intermediate outputs and the second and third intermediate outputs, respectively, and a 2 to 1 multiplexer 48. The multiplexer 48 selects between the first and second shift registers 44 and 46 of the output multiplexer circuit 48 and provides immediate data output.

The registers and multiplexers are connected to and controlled by instruction fetch control logic 50. The control logic 50 may be implemented with combinational logic or be provided by the host central processing unit (CPU). The control logic 50 controls the multiplexers and ensures that as data is clocked, it is present in a given register at the appropriate time. The invention is not limited to a particular implementation of the control logic. Those skilled in the art will be able to provide a control mechanism to suit a given application.

In operation, instructions and data are brought in from memory or other instruction source (not shown) to registers IDL and IDH by the control logic circuit 50. The instructions are then loaded by means of multiplexers 26, 30, 34 and 38 into selected registers IMH, IML, OPH, and OPL respectively. The outputs of these registers are provided directly to the processing logic, rather than being shifted to the first register as in a conventional first-in, first-out (FIFO) type instruction fetch platform.

For example, a four byte instruction would have two bytes of op code in registers OPL and OPH, with two bytes of the immediate data in registers IML and IMH. The bits from these registers would be read off in parallel to the processing circuit for execution. If the same instruction also contains four bytes, it will be loaded into the registers in the same order.

If the next instruction has two bytes, for instance, the op code might go in register OPL and the immediate data in register OPH. The immediate data (output) multiplexer 48 would then elect OPH to provide the data to the processing circuitry. The next instruction could be loaded with the OP code in the IML register and the second byte of the OP code or immediate could be loaded in the IMH register.

After the previous instruction in OPL and OPH is executed, the OP code in IML will be moved up to the OPL register through the corresponding multiplexer and the next byte of that instruction, whether OP code or immediate data, will be moved up to OPH. If there are further bytes of instruction, they will be loaded into IML and IMH through IDL and IDH. Otherwise, the beginning portions of the next instruction would be loaded.

In any case where the instruction in the registers requires data from an offset or displaced location, the calculation of the offset or displacement occurs while the instruction is held in the registers. In these cases, data stored in the IML and IMH registers is manipulated to obtain the correct offset address.

The data used to obtain the offset is then destroyed by writing over it in registers IML and IMH with new data which will be used by the same OP code in registers OPL and OPH.

Thus address information stored in intermediate locations in the instruction byte stream is written over before being provided to the processor circuitry. Note that, with respect to the set of registers which holds the instructions and data no set "exit" point exists.

The present invention has been described herein with reference to a particular embodiment for a particular application. Those having ordinary skill in the art and access to the present teachings will recognize additional modifications, applications and embodiments within the scope thereof.

It is therefore intended by the appended claims to cover any and all such applications, modifications and embodiments within the scope of the present invention.

Accordingly,

What is claimed is:

1. An instruction fetch circuit including:
    first shift register means for storing a digital word having first and second bytes, said first shift register means providing first and second outputs of said first and second bytes respectively;
    first multiplexer means for selecting and storing either of said first and second outputs of said first shift register means and providing a first intermediate output corresponding thereto the first multiplexer means including;
    second multiplexer means for selecting and storing either of said first or second outputs of said first shift register means or said first intermediate output and providing a second intermediate output corresponding thereto;
    third multiplexer means for selecting and storing either of said first or second outputs of said first register means or said first intermediate output or said second intermediate output and providing a third intermediate output corresponding thereto;
    fourth multiplexer means for selecting and storing either of said first or second outputs of said first register means or said first intermediate output or said second intermediate output or said third intermediate output and providing a fourth intermediate output corresponding thereto, said first, second, third, fourth multiplexer means each include a multiplexer connected to a shift register;

output multiplexer means for selectively outputting either said first and second intermediate outputs or said second and third intermediate outputs, said output multiplexer means including a second and third shift register connected to a multiplexer; and instruction fetch control means for selectively activating said first shift register means and said first, second, third, fourth and output multiplexer means, and for allowing the first and second bytes of a data word to be shifted separately and allowing for a loading of a first instruction with a fetch of a next instruction.

* * * * *